US006690145B2

(12) United States Patent
Stevens et al.

(10) Patent No.: US 6,690,145 B2
(45) Date of Patent: Feb. 10, 2004

(54) PERMANENT MAGNET ALTERNATOR AND VOLTAGE REGULATOR CIRCUIT FOR THE PERMANENT MAGNET ALTERNATOR

(75) Inventors: Julius J. Stevens, Fort Deposit, AL (US); William C. Edmundson, Winona Lake, IN (US); Ronald E. Murray, Montgomery, AL (US); Craig G. Young, Prattville, AL (US)

(73) Assignee: E-Tec Corporation, Fort Deposit, AL (US)

( * ) Notice: Subject to any disclaimer, the term of this patent is extended or adjusted under 35 U.S.C. 154(b) by 0 days.

(21) Appl. No.: 10/109,667

(22) Filed: Apr. 1, 2002

(65) Prior Publication Data

US 2003/0184244 A1 Oct. 2, 2003

(51) Int. Cl.[7] .............................. G05F 1/56; H02M 7/04
(52) U.S. Cl. ......................... 323/266; 323/273; 363/89; 363/86
(58) Field of Search ................................ 323/266, 269, 323/268, 272, 273, 284, 282, 275; 363/85, 86, 125, 128, 89, 49, 83

(56) References Cited

U.S. PATENT DOCUMENTS

| | | | |
|---|---|---|---|
| 4,027,229 A | | 5/1977 | Frink |
| 4,307,440 A | | 12/1981 | Inoue et al. |
| 4,325,021 A | | 4/1982 | McMackin |
| 4,754,388 A | * | 6/1988 | Pospisil ....................... 363/54 |
| 4,985,670 A | * | 1/1991 | Kaneyuki et al. ........... 323/297 |
| 5,489,811 A | | 2/1996 | Kern et al. |
| 5,828,204 A | | 10/1998 | Jansen |
| 5,828,206 A | | 10/1998 | Hosono et al. |
| 5,831,366 A | | 11/1998 | Kern et al. |
| 5,982,153 A | | 11/1999 | Nagai et al. |
| 6,014,324 A | | 1/2000 | Deck |
| 6,055,166 A | | 4/2000 | Jacobs et al. |
| 6,094,040 A | | 7/2000 | Meier et al. |
| 6,137,199 A | | 10/2000 | Lindsley |
| 6,169,391 B1 | | 1/2001 | Lei |
| 6,236,134 B1 | * | 5/2001 | Syverson ..................... 310/181 |
| 6,300,748 B1 | | 10/2001 | Miller |

* cited by examiner

Primary Examiner—Rajnikant B. Patel
(74) Attorney, Agent, or Firm—Nixon Peabody LLP; Tim L. Brackett, Jr.

(57) ABSTRACT

A permanent magnet alternator including a stationary stator including a plurality of spaced stator poles projecting inwardly from the stator, a winding circuit wound through the spaces between the stator poles, a rotor assembly mounted for rotation within the stator, including a plurality of permanent magnets fixedly mounted on an outer circumferential surface of the rotor in alternating polarity, and a retaining shield for reducing the effects of centrifugal motion of the rotor during operation of the alternator. A voltage regulator circuit is also provided for applying the output of the permanent magnet alternator having at least one stator mounted coil to a load, and includes a rectifier circuit having an output and an input adapted to be connected to a stator mounted coil for converting alternating potential to a time varying single potential on the output, a current control circuit connected between the output of the rectifier circuit and the load, an instantaneous voltage sensing circuit connected with the output of the rectifier circuit and the current control circuit for measuring the instantaneous voltage appearing on the output and for causing the current control circuit to assume its conductive state when the instantaneous voltage is above a predetermined amount, and a regulator control circuit for sensing the voltage applied to the load by the current control circuit and for causing the current control circuit to assume its non conductive state when the voltage applied to the load is above a desired level and for shortening the time during which the current control circuit is in its conductive state as the voltage applied to the load approaches the predetermined level.

5 Claims, 9 Drawing Sheets

PERMANENT MAGNET ALTERNATOR AND VOLTAGE REGULATOR CIRCUIT FOR THE PERMANENT MAGNET ALTERNATOR

BACKGROUND OF THE INVENTION

1. Field of the Invention

The present invention is directed generally to a light weight alternator, and in particular, a permanent magnet-type alternator including a voltage regulator for regulating the voltage output of the permanent magnet-type alternator.

2. Field of the Related Art

Various alternators use wound stator and rotor assemblies in which an electromagnetic force is produced in and around the rotor windings by admitting current through the rotor windings. In such designs, as the magnetic field produced in the spinning rotor couples with the windings at the stator, current is induced in the stator windings. These alternators, however, require brushes or slip rings to maintain a closed circuit for admitting the current necessary in the rotor during rotation. Because the brushes or slip rings are mechanical connections, they are susceptible to wear and corrosion.

The use of permanent magnet alternators have been found to be advantageous since they do not require that current be supplied to the rotor. In other words, the field inherent to and produced by the magnetic material of the permanent magnet alternators induces current in the stator as the magnet poles move in respect to the stator windings. Because it is not required to supply current to the rotor, slip rings and brushes are not required.

While the use of permanent magnet alternators have proven successful for various applications, the prior art systems have several shortcomings. Generally, because the alternator generates excessive heat, internal fans are provided on the drive end to cool the windings and the rotor. This increases the weight of the alternator, and thus, makes it undesirable for use in an automotive or aerospace capacity where fuel efficiency is needed. Moreover, many systems require the attachment of individual magnets to the outer circumferential surface of the rotor, which may result in the failure of the alternator if by chance one or more magnets becomes detached from the rotor due to the high centrifugal forces that result from the rotation of the rotor at high rpm or faulty adhesion between the magnet and surface. Yet another problem associated with permanent magnet alternators is the difficulty associated with controlling the output voltage generated in the stator windings as will otherwise inherently occur when the alternator is driven at variable rotational velocities. These drawbacks of the prior art are especially problematic in the vehicular environment where low cost, high reliability and light weight are all important to achieving a commercially acceptable design.

SUMMARY OF THE INVENTION

In view of the foregoing, it is an object of the present invention to overcome the disadvantages in the related art by providing a permanent magnet alternator for use in an automotive or aerospace capacity that is of a size that allows it to be placed in small areas of an automobile or aircraft engine compartment.

It is another object of the present invention to provide a permanent magnet alternator that is light-weight and highly efficient.

It is a yet another object of the present invention to provide a permanent magnet alternator that has a high cooling capacity.

It is still another object of the invention to provide a permanent magnet alternator that allows the rotation of the rotor at high rpm without resulting in the detachment of magnets from the rotor.

It is yet a further object of the invention to provide a permanent magnet alternator with a voltage regulator that independently regulates and controls the charging current produced by the alternator.

These as well as other objects are achieved in accordance with the invention including a permanent magnet alternator assembly provided with a stationary stator, a rotor mounted for rotation within the stator, a winding circuit for generating a magnetic flux, a plurality of permanent magnets for attachment to the rotor, and a retaining shield positioned between the rotor and stator for reducing the effects of centrifugal motion of the rotor during operation of the alternator.

The stator includes a substantially cylindrical core or body in which a plurality of stator poles project radially inward from the stator body. Each stator pole is composed of a longitudinal shank portion including a base end which is attached to the stator body and a distal end which is flared to facilitate ease during assembly of the winding circuit.

The rotor has a substantially cylindrical body having a laminated structure including a core section preferably comprising a non-ferromagnetic material that is both light-weight and non-corrosive such as aluminum, and an outer circumferential surface preferably comprising a ferromagnetic material such as steel or the like. The permanent magnets are fixedly mounted or attached to the outer circumferential surface of the rotor body in alternating polarity. In order to further reduce the overall weight of the alternator, it is preferred that light-weight, yet high field strength magnets are used, such as those composed of Neodymium-Iron-Boron (NdFeB).

The retaining shield is positioned between the stator poles and the permanent magnets to reduce the effects of centrifugal motion of the rotor body during operation of the alternator, and the undesirable effects of vibration. The retaining shield is preferably a cylindrical sleeve composed of a non-ferromagnetic material such as stainless steel. The use of the retaining sleeve is advantageous in that it reduces the centrifugal forces and allows rotation of the rotor at high rpm without resulting in the detachment of magnets from the rotor and the possible destruction of the alternator.

In a second embodiment, the permanent magnet alternator assembly includes a laminated, bifurcated rotor having a first rotor section and a second rotor section, each rotor section having a substantially cylindrical body composed of a light-weight, non-ferromagnetic material such as aluminum, and an outer circumferential surface composed of a ferromagnetic material such as steel.

A plurality of fan-like projections are provided equidistant on the peripheral surface of each rotor section. The placement of the fans directly on the surface of each rotor section is advantageous since it obviates the need for drive end fans for cooling the rotors and windings, and thus, further reduces the overall weight of the alternator. The fan-like projections project outward from the side of each rotor section in order to provide the efficient distribution of air inside the alternator housing. In particular, the projections project along a plane that lies substantially parallel relative to the outer circumferential surface. In this way, high ambient temperatures produced inside the alternator during rotation of the rotor are significantly reduced.

A third embodiment of the invention includes a permanent magnet alternator having a stator including a substantially cylindrical body and a plurality of spaced stator poles that project outward from a side surface of the stator body. In particular, the stator poles project along a plane lying substantially parallel relative to an outer circumferential surface of said stator body.

A rotor is also provided including a substantially cylindrical body mounted for rotation relative to the stator body in a face-to-face spatial relationship, as opposed to the conventional manner of rotating inside or outside of the stator. Moreover, a plurality of permanent magnets are fixedly mounted equidistant on the rotor body in alternating polarity and project outward from a side surface of the rotor body. In particular, each permanent magnet projects along a plane lying substantially parallel relative to an outer circumferential surface of the rotor. In this way, the rotor body may be operatively positioned relative to the stator body such that the permanent magnets are rotatably aligned in a face-to-face manner with the stator poles so as to generate a continuous alternating flux density magnetic field along a primary flux path.

The winding of the conductors or winding circuit on the stator poles in accordance with this embodiment is advantageous over conventional winding concepts in that the winding circuit does not require being pulled around and over the outer circumferential surface of the stator. This results in a less bulky design radially, which is further advantageous in terms of weight.

Moreover, a voltage regulator circuit is also provided for regulating the charging current produced by the permanent magnet alternators described above. The regulator circuit is adapted to receive the output of a 3-phase permanent magnet alternator, however, other single phase or multi-phase permanent magnetic alternators could be used to provide the input to the regulator circuit.

The voltage regulator circuit in accordance with this embodiment of the invention includes a rectifier circuit having an output and an input adapted to be connected to a stator mounted coil for converting alternating potential to a time varying single potential on said output, a current control circuit connected between the output of the rectifier circuit and the load and for cycling between (1) a conductive state to conductively connect said rectifier circuit with the load, and (2) a non-conductive state to isolate the rectifier circuit from the load. Also provided is an instantaneous voltage sensing circuit connected with the output of the rectifier circuit and the current control circuit for measuring the instantaneous voltage appearing on the output and for causing the current control circuit to assume its conductive state when the instantaneous voltage is above a predetermined amount.

Last, a regulator control circuit is provided for (1) sensing the voltage applied to the load by the current control circuit and for causing the current control circuit to assume its non conductive state when the voltage applied to the load is above a desired level, and (2) for shortening the time during which the current control circuit is in its conductive state as the voltage applied to the load approaches the predetermined level. The regulator control circuit may include a sensing circuit for determining if a short circuit exists by measuring the period of time the current control circuit is in a conductive state. The regulator control circuit may further include an input connected with an RC circuit for adjusting the operating voltage of the regulator circuit in response to changes in the duty cycle of the current control circuit.

The voltage regulator circuit may include an alternator failure indicator responsive to an over voltage or under voltage condition to produce an alternator failure indication. The voltage regulator circuit may further include a load dump circuit selectively connectable in parallel with the load, the load dump circuit being connected in parallel when the voltage applied to the load continues to increase for more than a predetermined period.

DETAILED DESCRIPTION OF THE INVENTION

Referring now to FIGS. 1–4, which illustrate in a first embodiment of the invention a permanent magnet alternator assembly 10 including a stationary stator 20, a rotor 30 mounted for rotation within the stator, a winding circuit 40 for generating a magnetic flux, a plurality of permanent magnets 50 for attachment to the rotor 30, and a retaining shield 60 positioned between the stator 20 and rotor 30 for reducing the effects of centrifugal motion of the rotor 30 during operation of the assembly 10.

Figure 1:
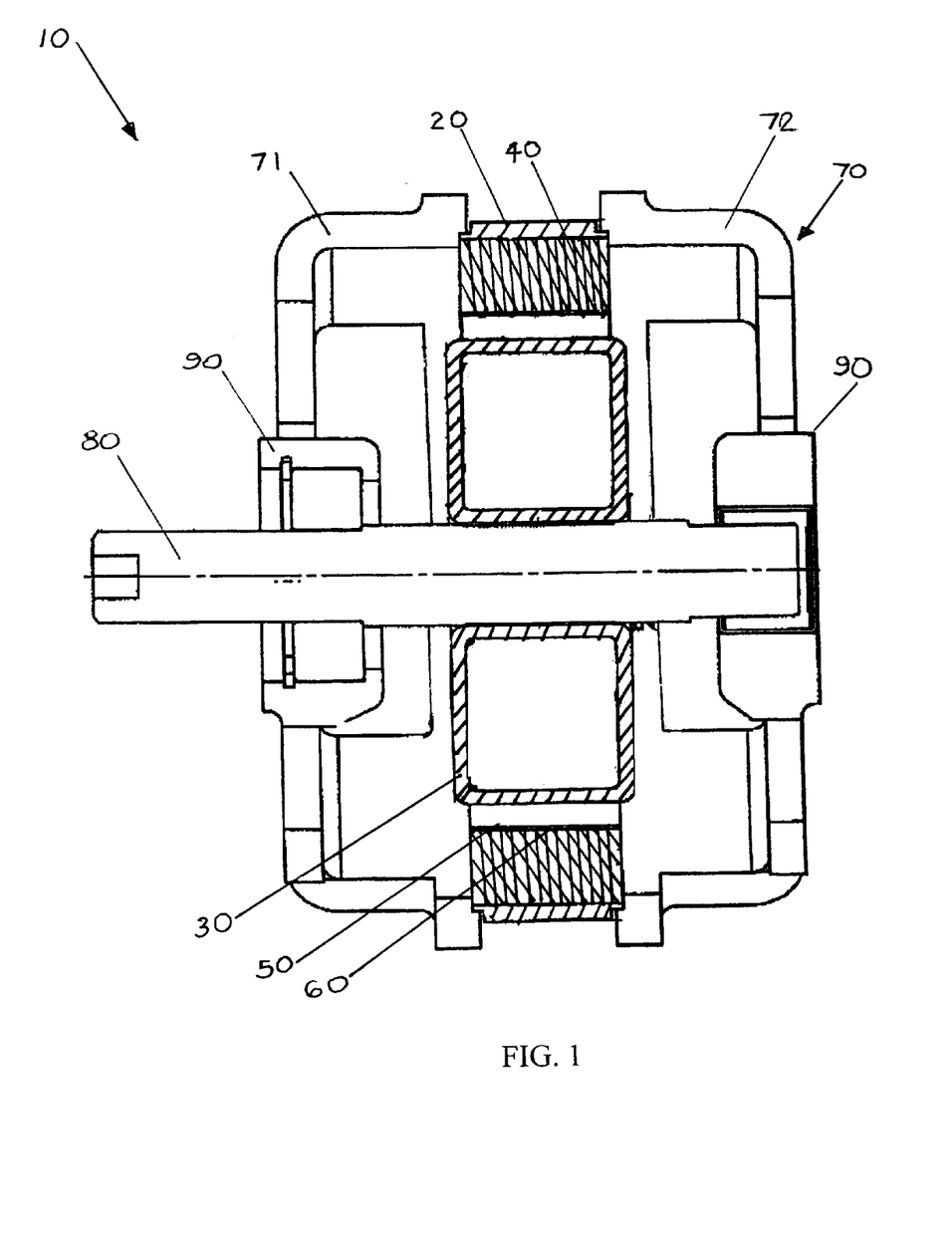
FIG. 1 illustrates a cross-sectional view of a permanent magnet alternator assembly in accordance with a first embodiment of the invention.

As shown in FIG. 1, to assembly the alternator 10, the stator 20 is clamped between a two-piece housing 70. Preferably, the housing 70 comprises a material that is non-ferromagnetic, light-weight, non-corrosive and provides good heat dissipation. In this regard, it is preferred that the material selected for the housing 70 comprises aluminum. The housing 70 has first 71 and second 72 housing sections that may be connected using any conventional manner such as bolts, screws or the like. The rotor 30 is mounted for rotation on a rotor shaft 80 that extends from a power source such as an engine (not shown) through the housing 70. Bearings 90 are provided to support the rotor body 31 and are mounted in the front and rear of the housing 70.

Figure 2A:
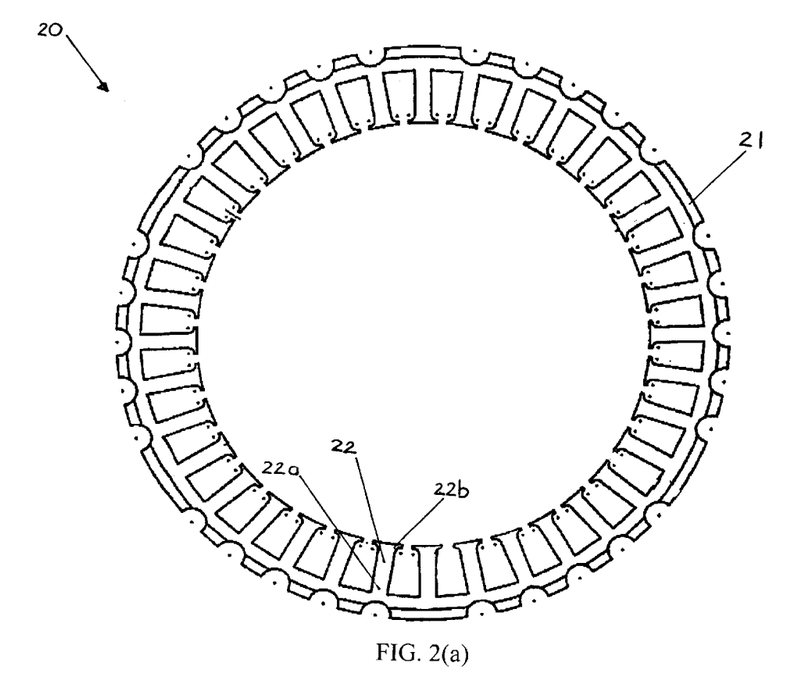
FIGS. 2(a) and 2(b) illustrate front and side views of a stator assembly in accordance with a first embodiment of the invention.
Figure 2B:
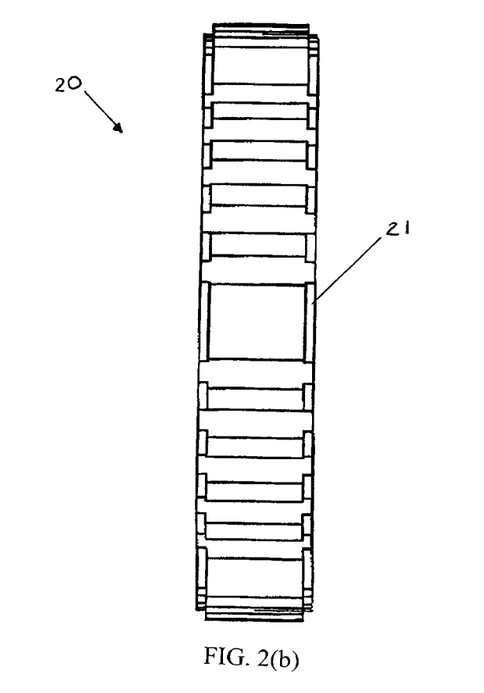

As illustrated in FIGS. 1, 2(a) and 2(b), the stator 20 comprises a substantially cylindrical core or body 21 in which a plurality of stator poles 22 project radially inward from the stator body 21. Each stator pole 22 comprises a longitudinal shank including a base end 22a which is attached to the stator body 21 and a distal end 22b which is flared to facilitate ease during assembly of the winding circuit 40. The stator body 21 and stator poles 22 are preferably composed of a ferromagnetic metal such as steel or the like.

Figure 3A:
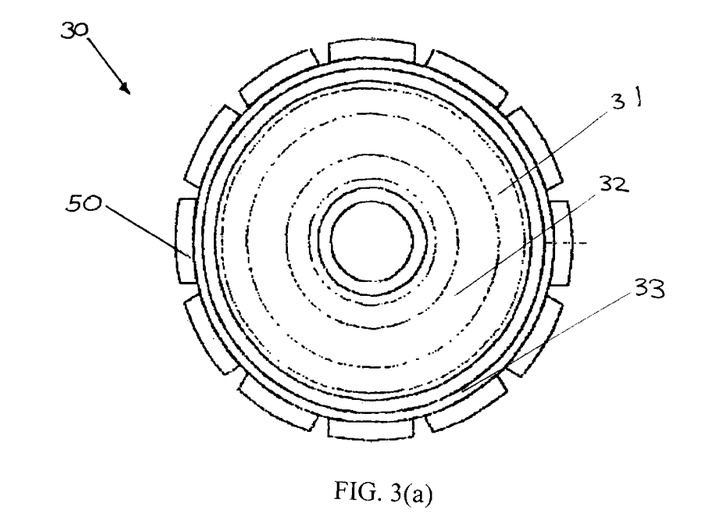
FIGS. 3(a)–3(c) illustrate front, side and plane views of a rotor assembly in accordance with the first embodiment of the invention.
Figure 3B:
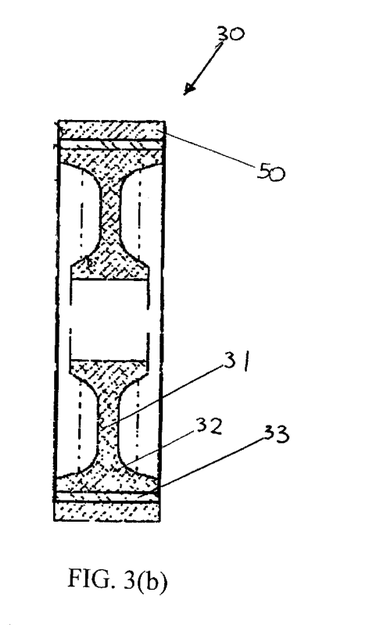
Figure 3C:
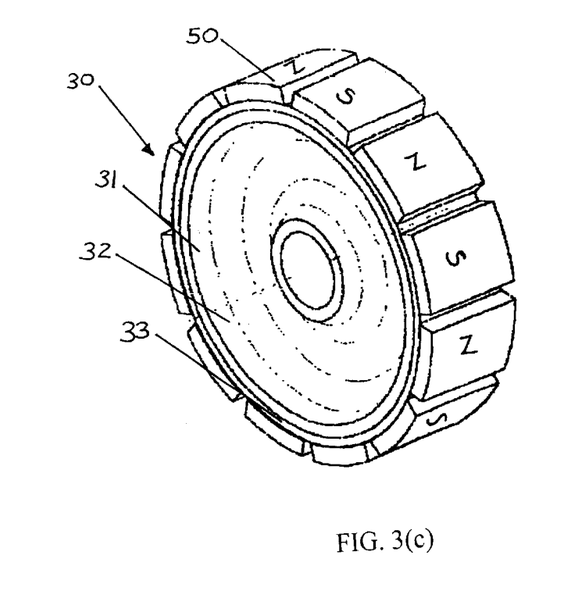

As shown in FIGS. 3(*a*)–3(*c*), the rotor 30 comprises a substantially cylindrical body 31 having a laminated structure. In particular, the rotor body 31 includes a core section 32 preferably comprising a non-ferromagnetic material that is both light-weight and non-corrosive, and an outer circumferential surface 33 preferably comprising a ferromagnetic material. In this regard, it is preferred that the non-ferromagnetic metallic material comprises aluminum while the ferromagnetic material comprises steel.

The permanent magnets 50 are fixedly mounted or attached to the outer circumferential surface 33 of the rotor body 31 in alternating polarity. Preferably the permanent magnets 50 are attached to the outer circumferential surface 33 using a suitable adhesive that is not adversely effected by the high temperature and stress environment of the alternator 10. In order to further reduce the overall weight of the alternator 10, it is preferred that light-weight, yet high field permanent magnets are used. In this regard, the permanent magnets 50 may comprise high field Neodymium-Iron-Boron (NdFeB).

Figure 4A:
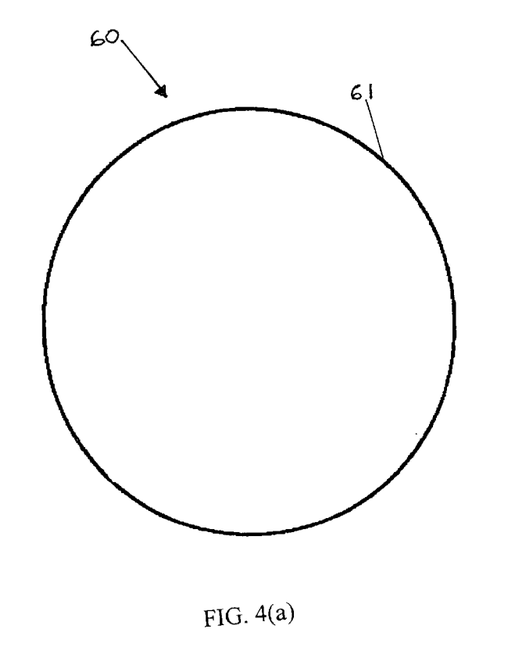
FIGS. 4(a) and 4(b) illustrate front and side views of a retaining mechanism.
Figure 4B:
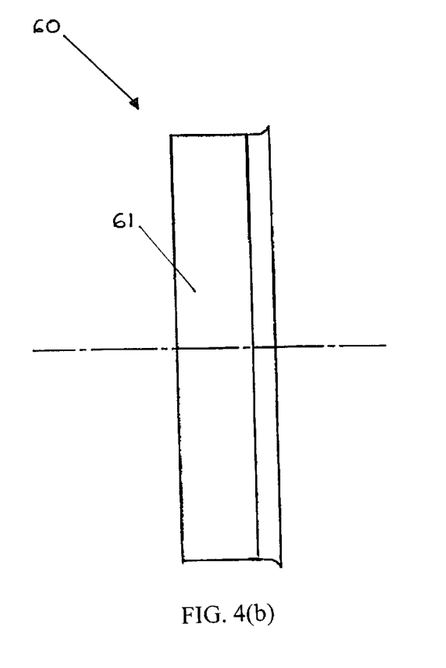

As shown in FIGS. 1, 4(*a*) and 4(*b*), the retaining shield 60 is positioned between the stator poles 22 and the permanent magnets 50 to reduce the effects of centrifugal motion of the rotor body 31 during operation of the alternator 10. Once the retaining shield 60 is installed, a radial air gap (not shown) is formed between the retaining shield 60 and the stator 20 in order to prevent friction during operation. The retaining shield 60 is a cylindrical sleeve comprising a non-ferromagnetic material such as stainless steel. However, the sleeve is not limited to stainless steel and may comprise any material that exhibits high strength and high corrosion properties during high temperature operation.

Figure 5:
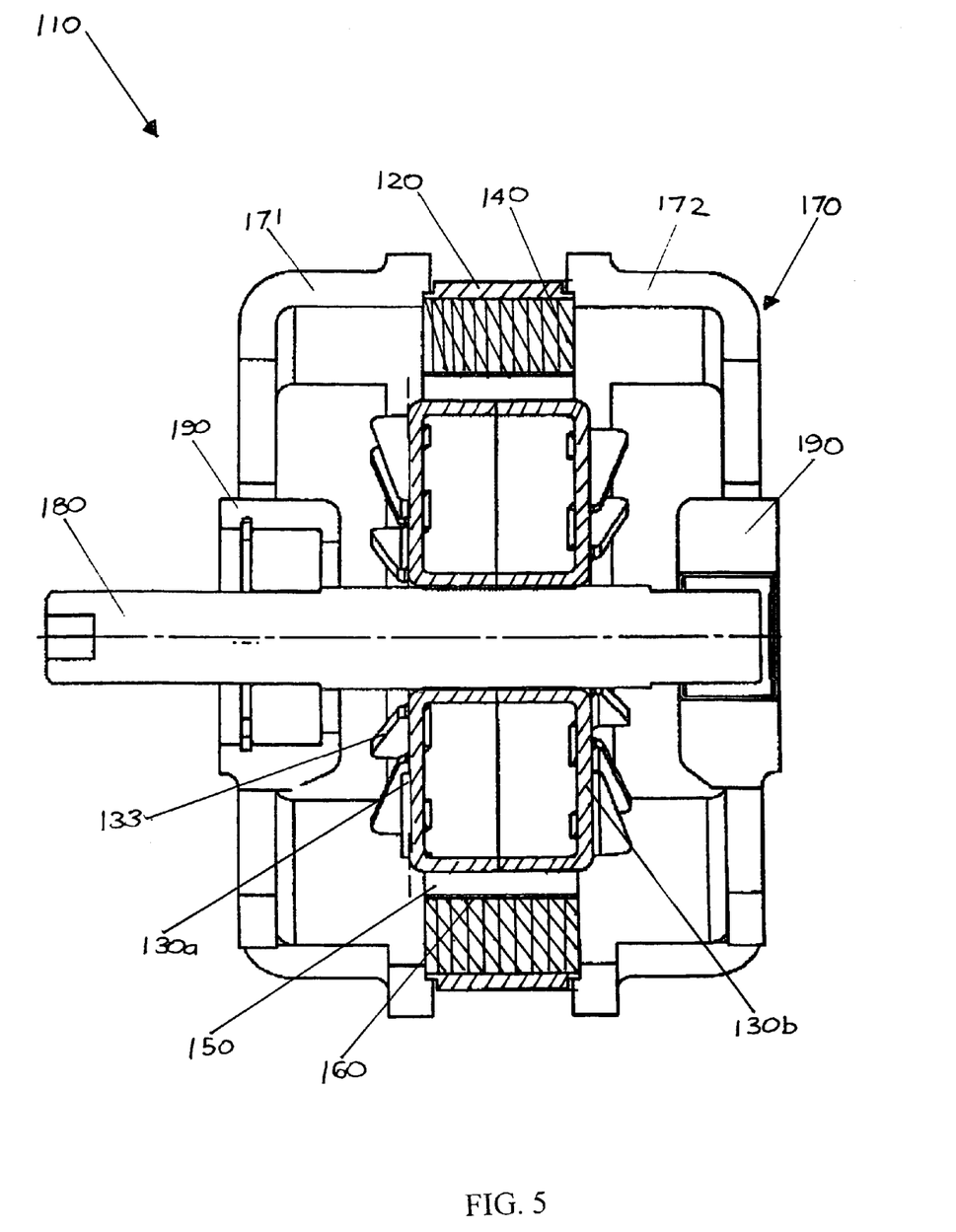
FIG. 5 illustrates a cross-sectional view of a permanent magnet alternator assembly in accordance with a second embodiment of the invention.

Referring now to FIG. 5, which shows a permanent magnet alternator assembly 110 in a second embodiment of the invention, including a stator 120, a rotor 130, a winding circuit 140, a plurality of permanent magnets 150, and a retaining shield 160. The stator 120, winding circuit 140, permanent magnets 150, and retaining shield 160 each have the same structure as previously described in the first embodiment.

Figure 6A:
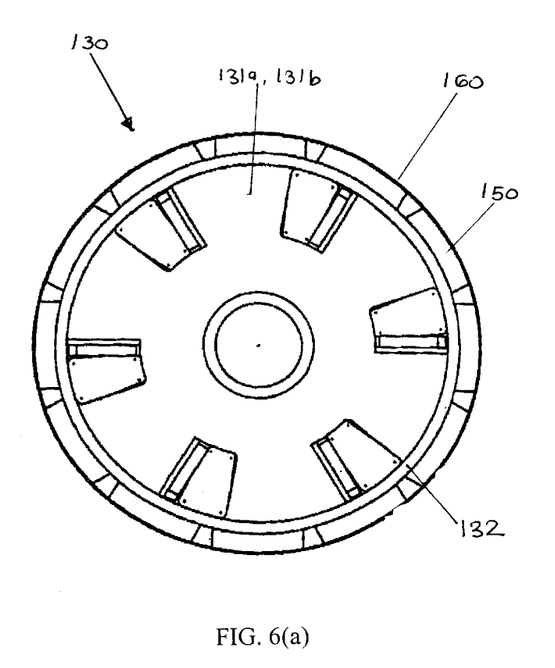
FIGS. 6(a) and 6(b) illustrate top and side views of the rotor assembly and retaining shield in accordance with the second embodiment of the invention.
Figure 6B:
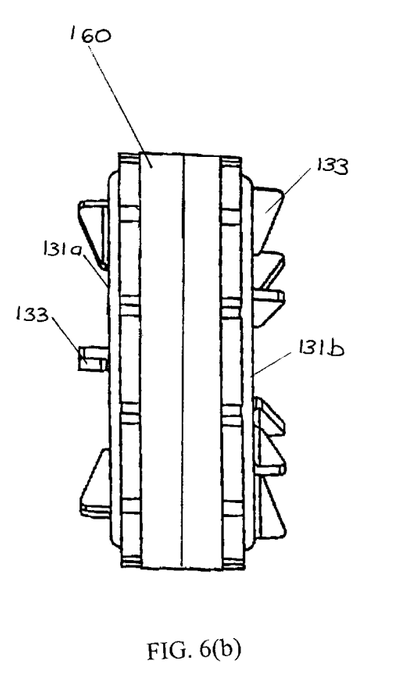

As shown in FIGS. 5, 6(*a*) and 6(*b*), the rotor 130 is a bifurcated-type comprising a first rotor section 130*a* and a second rotor section 130*b*, each having a substantially cylindrical body 131*a*, 131*b* preferably comprising a non-ferromagnetic material such as aluminum, an outer circumferential surface 132*a*, 132*b* preferably comprising a ferromagnetic material such as steel.

A plurality of fan-like projections 133 are provided equidistant on the peripheral surface of the rotor body 131*a*, 131*b*. The placement of the fans directly on the surface of the rotor sections 130*a*, 130*b* obviates the need for drive end fans for cooling the rotors 130*a*, 130*b* and windings 140, and thus, further reduces the overall weight of the alternator. The fan-like projections 134*a*, 134*b* are triangular-shaped and project outwardly from the side of the rotor body 131*a*, 131*b* in order to provide the efficient distribution of air inside the housing 170. In particular, the projections 133 project along a plane that lies substantially parallel relative to the outer circumferential surface 132*a*, 132*b*. In this way, high ambient temperatures produced inside the alternator 110 during rotation of the rotor 130 are significantly reduced. Although the projections 133 shown in FIGS. 5, 6(*a*) and 6(*b*) are triangular-shaped, they may take the form of various different geometries in order to produce the desired cooling effect.

During assembly of the alternator 110, each rotor section 130*a*, 130*b* is mounted for rotation on a rotor shaft 180 by press fit. Bearings 180 are provided to support each rotor section 130*a*, 130*b* on the shaft 170. Like the first embodiment, the permanent magnets 150 are fixedly mounted using a suitable adhesive to the outer circumferential surface 133*a*, 133*b* of each rotor body 131*a*, 131*b* in alternating polarity.

Figure 7:
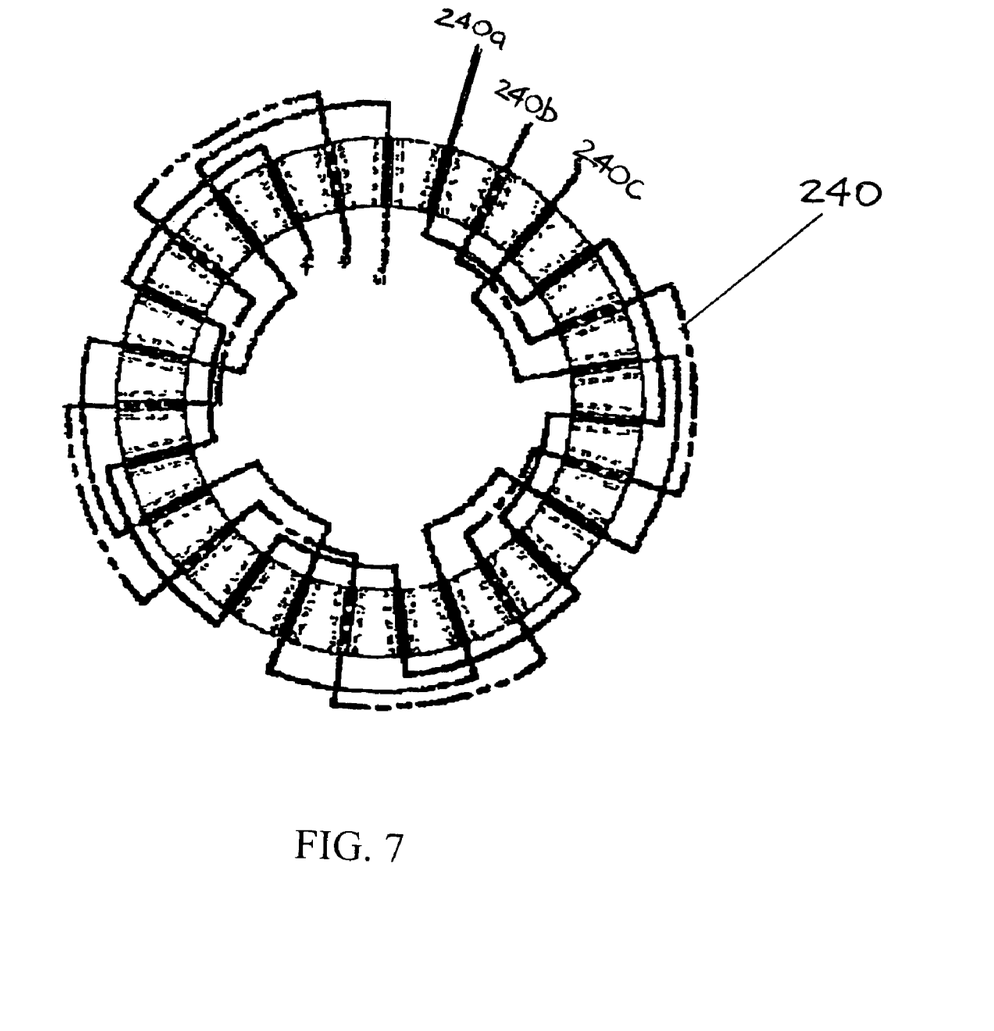
FIG. 7 illustrates a plane view of a stator and rotor in accordance with a third embodiment of the invention.

As shown in FIG. 7, a third embodiment of the invention includes a permanent magnet alternator 210 having a stator 220 including a substantially cylindrical body 221 and a plurality of spaced stator poles 222 fixedly mounted on the stator body 221. Each of the stator poles 222 project outwardly from a side surface of the stator body 221. In particular, the stator poles 222 project along a plane lying substantially parallel relative to an outer circumferential surface of said stator body 221. Each stator pole 222 comprises a longitudinal shank including a base end 222*a* which is attached to the stator body 221 and a distal end 222*b* which is flared to facilitate ease during assembly of a winding circuit 240 through the spaces of the of stator poles 222. As in the previously-described embodiments of the invention, the stator body 221 and stator poles 222 are preferably composed of a ferromagnetic metal such as steel or the like.

A rotor 230 including a substantially cylindrical body 231 is mounted for rotation relative to the stator body 221 in a face-to-face spatial relationship. A plurality of permanent magnets 250 are fixedly mounted equidistant on the rotor body 231 in alternating polarity. In accordance with this embodiment, each of the permanent magnets 250 project outward from a side surface of the rotor body 231. In particular, each permanent magnet 250 projects along a plane lying substantially parallel relative to an outer circumferential surface of the rotor body. Moreover, the rotor body is operatively positioned relative to the stator body such that the permanent magnets 250 are rotateably aligned in a face-to-face manner with the stator poles 222 so as to generate a continuous alternating flux density magnetic field along a primary flux path.

Figure 8:
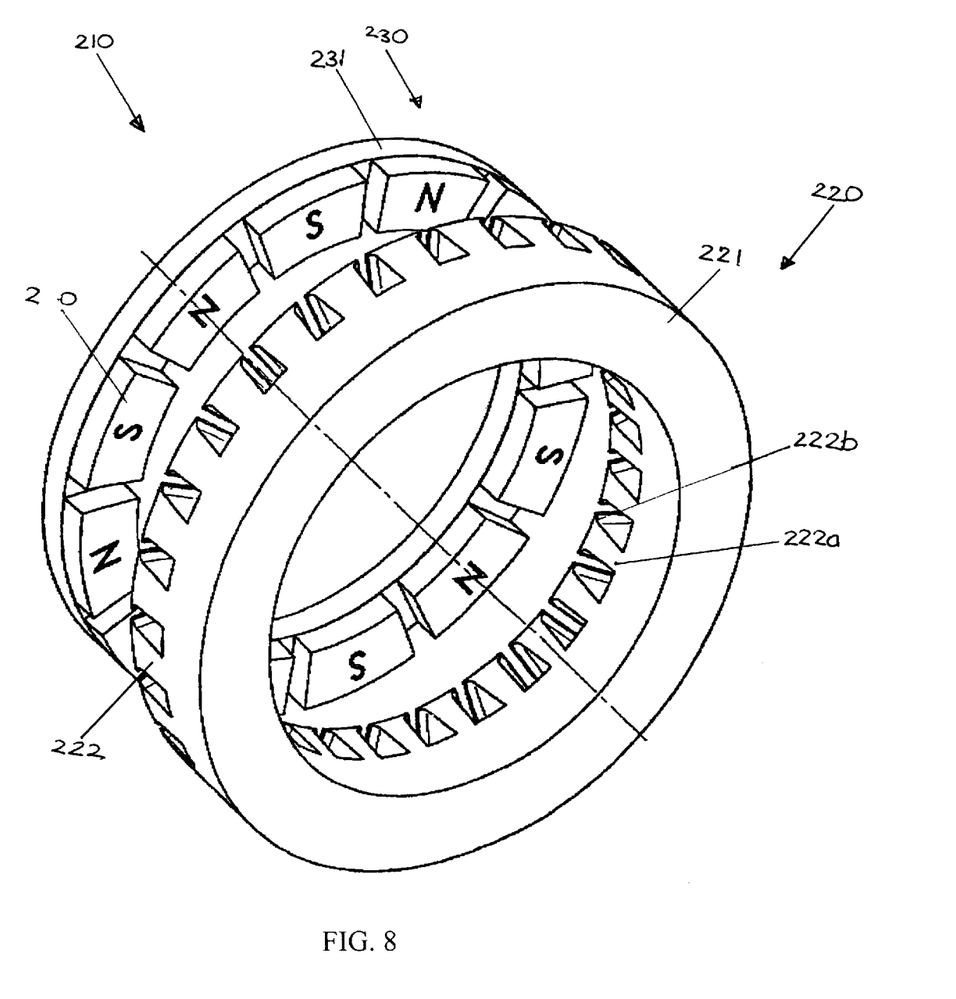
FIG. 8 illustrates a front view of a stator assembly in accordance with a third embodiment of the invention.

FIG. 8 shows the construction of the winding circuit 250 on the stator poles 222 in accordance with the third embodiment. The winding circuit 240 is composed of a first winding portion 240*a*, a second winding portion 240*b*, and a third winding portion 240*c*, whereby each portion 240*a*, 240*b*, 240*c* is individually wound so as to alternatively occupy every third space between the extending stator poles 222. This design is also advantageous over conventional wiring concepts in that the winding circuit 240 does not require being pulled around and over the outer circumferential surface of the stator 220.

To implement the subject invention, it is desirable to provide a mechanism for regulating the charging current produced by the permanent magnet alternators described above. For example, reference is made to FIG. 9, wherein a suitable regulator circuit 300 is illustrated. This circuit 300 is specifically adapted to receive the output of a 3-phase permanent magnet alternator, but other single phase or multi-phase permanent magnetic alternators could be used to provide the input to the regulator circuit 300.

Figure 9:
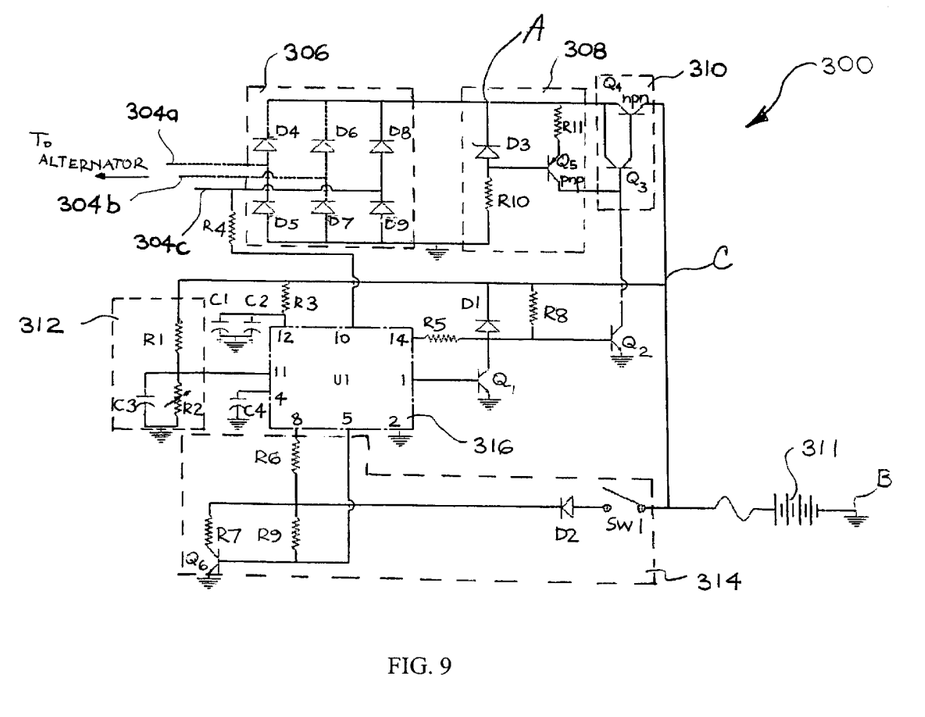
FIG. 9 illustrates a schematic diagram of a voltage regulator for use in combination with the permanent magnet alternator of the present invention.

Each phase of the alternator is formed by one or more stator mounted coil(s) that are subjected to a time varying magnetic field produced by rotation of the alternator rotor. Thus, each phase is connected with a corresponding input 304a, 304b and 304c. As the rotor rotates, a potential is developed in the corresponding coil(s) that is applied to the full wave rectifier 306 formed by diodes D4 through D9. Output from the full wave rectifier 306 takes the form of a full wave rectified direct current voltage at point A. The magnitude of this time varying voltage will depend on a number of factors including the strength of each permanent magnet, the speed of rotation of the rotor, the number of turns in each alternator coil, the size of the load circuit, resistance (including reactive) of each coil, and environmental factors such as temperature. Unless otherwise noted, all voltage potentials of the voltage regulator circuit 300 will be referenced to point B, which is at ground potential.

The regulator circuit 300 of FIG. 9 includes a pre-regulator circuit 308 for sensing the instantaneous voltage produced by full wave rectifier 306 and for producing a control signal when the instantaneous voltage exceeds a predetermined value. Regulator circuit 300 further includes a current control circuit 310 for alternating between a conductive state in which current is allowed to flow into the load (for example, a battery 311) and a non-conductive state in which current is prevented from flowing to the load. FIG. 9 also illustrates the use of a comparison circuit 312 for responding to the voltage at point C in a manner to prevent the voltage applied to the load from reaching an excessively high level. An annunciator circuit 314 is provided to sense certain potentially undesirable operating conditions.

A regulator control circuit 316, connected to input 304c, current control circuit 310, comparison circuit 312 and annunciator circuit 314, is illustrated in FIG. 9. As will be discussed more fully below, regulator circuit 316 responds to sensed conditions to produce appropriate control signals to implement desired operation of the regulator circuit.

To understand the operation of the regulator circuit 300, reference is again made to FIG. 9. In particular, pre-regulator circuit 308 includes a series connection of zener diode D3 and resistor R10 extending between point A and ground B. When D3 reaches its rated voltage, it breaks down causing a constant voltage at the base of transistor Q5, a pnp-type transistor, which becomes forward biased due to the voltage potential between its base and emitter junctions. Current flows through the emitter to collector junction of Q5 and applies a startup voltage to current control circuit 310.

Referring now to current control circuit 310, there is provided an npn transistor Q4 whose collector-emitter circuit is connected between points A and C of the regulator circuit 300. Q4 toggles between a conductive state in which current is allowed to flow from the full-wave rectifier to the load (i.e., battery 311) and a non-conductive state in which current flow is effectively cut off. The duty cycle of transistor Q4 controls the effective flow of charging current to battery 311. The base of transistor Q4 is connected with the emitter of npn transistor Q3. The collector of Q3 is connected with the collector of Q4 such that upon Q5 becoming forward biased, current is caused to flow through the emitter to collector junction of Q5 to apply a startup voltage to the transistor Q3.

Voltage applied to the base of Q3 from Q5 of the pre-regulator circuit 308 causes the base to emitter junction of Q3 to become forward biased, which causes current to flow through Q3. This situation causes a voltage potential to be applied to the base of transistor Q4, an npn-type transistor, which becomes forward biased because of the voltage potential difference between its base and collector junctions. Thus, Q4 turns on and allows current to flow through its collector to emitter junctions. This current will flow into and charge the battery until the control signal from the comparison circuit 312 is reduced to a point that Q3 of the control element is turned off, which stops the current flow through Q4.

The voltage potential at point C is applied to the voltage divider of R1 and R2. The sample point between R1 and R2 is applied to pin 11 of regulator control circuit 316 which will be discussed in more detail below. The desired voltage at C may be set by adjustment of a variable resistor R2 which thus forms a potentiometer.

Regulator control circuit 316 may take the form of an integrated chip suitable for the application in which it is required. One example of a suitable integrated circuit chip to form circuit 316 would be a Motorola CS3351. The operating frequency of circuit 316 may be set by selection of the value of C4 connected between pin 4 and ground. A representative value of capacitor C4 would be 0.022 $\mu$F, although this value could range between 0.010 $\mu$F and 0.047 $\mu$F. The operating voltage for regulator control circuit 316 is established by an R-C circuit formed of resistor R3 and capacitors C1 and C2. The ground potential is applied to pin 2.

In operation, the alternator voltage is sensed at pin 10 of regulator control circuit 316. If the voltage potential at point C is below the pre-determined voltage potential set by adjustment of R2, regulator control circuit 316 will provide an output voltage potential at pin 1 sufficient in amplitude to forward bias the base emitter junction of transistor Q1. This output voltage may be termed a "drive voltage." This condition causes the collector to emitter junction of Q1 to conduct. The voltage at the collector of Q1 is 180 degrees out of phase with the voltage at the base of transistor Q1 and is applied to the base of transistor Q2. Thus transistor Q2 will operate in a complementary manner to transistor Q1 to provide a voltage at the collector of Q2 that is in phase with the output at pin 1 of regulator control circuit 316 and at a sufficient voltage potential to forward bias the base emitter junction of Q3 in the control circuit 310. Thus, the duty cycle of current control circuit 310 is responsive to the output of regulator control circuit 316.

Regulator control circuit 316 also operates to perform a number of important safety control functions. For example, pin 14 operates to perform a short circuit monitor. In particular, if pin 1 and pin 14 are simultaneously high for a predetermined time period, a short circuit is assumed and pin 1 is turned off removing the drive voltage. When this voltage is removed, voltage potential is removed from the base of Q2, Q3, and Q4 to thereby render the current control circuit 310 non-conductive and thereby shut off charging current to the battery. This causes the voltage potential at point C to be reduced. As the voltage potential sensed at pin 11 begins to approach the desired cutoff potential, pin 1 begins to change from a constant voltage potential to a square wave with the on duty cycle becoming shorter the closer point C approaches the desired predetermined voltage potential. In this way, voltage regulation of the rectified permanent magnet alternator is achieved.

The annunciator circuit 314 in association with the regulator control circuit 316 is also provided to provide visual warning of alternator failure and to operate a load dump circuit. In particular, as illustrated in FIG. 9, a transistor Q6 is provided with its emitter connected to ground and its base connected to pin 5 of the regulator control circuit 316. The collector is connected to the load through a switch Sw1, LED D2 and resistor 7. Biasing resistors 6 and 9 are connected to pin 8 of the regulator control circuit 316. If the alternator does not apply a voltage to pin 10 of the regulator control circuit 316 or if the voltage sensed at pin 11 indicates an over voltage condition, pin 5 outputs a voltage to the base of transistor Q6 which forward biases the base to emitter junction of Q6. This current flows through R7 and forward biases LED D2 causing it to indicate an alternator failure. If the regulator control circuit 316 is in an over voltage condition, and the voltage potential continues to rise, the over voltage indicating LED D2 will extinguish and the regulator control circuit 316 will enter a load dump condition by causing transistor Q6 to become conductive.

By way of example, the following commercially available circuit elements may be used to form the regulator circuit embodiment illustrated in FIG. 9.

| | |
|---|---|
| R1 | 50k ohm |
| R2 | 50k ohm variable |
| R3 | 270 ohm |
| R4 | 22k ohm |
| R5 | 10k ohm |
| R6 | 22k ohm |
| R7 | 1k ohm |
| R8 | 10k ohm |
| R9 | 2.2k ohm |
| R10 | 100 ohm |
| R11 | 4.7k ohm |
| C1 | .1 uF |
| C2 | 10 uF |
| C3 | .047 uF |
| C4 | .022 uF |
| Q1 | ZTX 853 |
| Q2 | ZTX 853 |
| Q3 | NTE 54 |
| Q4 | MJ14002 |
| Q5 | ZTX 757 |
| Q6 | ZTX 853 |
| D1 | 1N4004 |
| D2 | 12V LED |
| D3 | 1N746A |
| D4 | 7771 |
| D5 | 7771 |
| D6 | 7771 |
| D7 | 7771 |
| D8 | 7771 |
| D9 | 7771 |
| U1 | CS3351 |

Accordingly, each embodiment of the permanent magnet alternator in accordance with the present invention is advantageous over conventional designs in several respects. First, because the alternator is physically smaller, it permits installation in smaller spaces of an automobile or aircraft engine compartment. The light-weight nature of the alternator is especially advantageous as it pertains to the automotive and aerospace industries, whereby fuel efficiency is closely related to the weight of the vehicle/airplane. Moreover, because the alternator uses materials that imparts a more robust structural design, the disclosed alternator provides economic benefits by reducing repair costs and promoting a longer service life.

Still further, the placement of fan projections on the side surface of the rotor is advantageous in that it provides an overall design that has both a high cooling capacity and reduced weight. The use of the retaining shield is beneficial since it allows the rotation of the rotor at high rpm without resulting in the detachment of magnets from the rotor.

The use of permanent magnets yields several advantages in terms of cost of construction, durability, and economic feasibility. Moreover, the use of permanent magnets obviates the need for slip rings or brushes in order to bring electrical power into the rotational field element. Although the magnetic field provided by a permanent magnet alternator is not controllable, the invention achieves control of the system by using a voltage regulator which controls the effective current supplied to a load. The disclosed regulator circuit also provides a number of safety control and failure condition indications to insure proper operation of the system.

Although exemplary embodiments of the present invention have been described in detail herein, it should be appreciated by those skilled in the art that many modifications are possible without materially departing from the spirit and scope of the teachings and advantages which are described herein. Accordingly, all such modifications are intended to be included within the spirit and scope of the present invention.

What is claimed is:

1. A regulator for applying the output of a permanent magnet alternator having at least one stator mounted coil to a load, said regulator comprising:

a rectifier circuit having an output and an input adapted to be connected to a stator mounted coil for converting alternating potential into a time varying potential on said output;

a current control circuit connected between said output of said rectifier circuit and the load and for cycling between (1) a conductive state to conductively connect said rectifier circuit with the load and (2) a non-conductive state to isolate said rectifier circuit from the load;

an instantaneous voltage sensing circuit connected with said output of said rectifier circuit and said current control circuit for measuring the instantaneous voltage appearing on said output and for causing said current control circuit to assume its conductive state when said instantaneous voltage is above a predetermined amount; and a regulator control circuit for (1) sensing the voltage applied to the load by said current control circuit and for causing said current control circuit to assume its non conductive state when the voltage applied to the load is above a desired level and (2) for shortening the time during which said current control circuit is in its conductive state as the voltage applied to said load approaches the predetermined level.

2. A regulator as defined in claim 1, wherein said regulator control circuit includes a sensing circuit for determining if a short circuit exists by measuring the period of time said current control circuit is in a conductive state.

3. A regulator as defined in claim 1, wherein said regulator control circuit includes an input connected with an RC circuit for adjusting the operating voltage of said regulator circuit in response to changes in the duty cycle of said current control circuit.

4. A regulator as defined in claim 1, further including an alternator failure indicator responsive to an over voltage or under voltage condition to produce an alternator failure condition.

5. A regulator as defined in claim 1, further including a load dump circuit selectively connectable in parallel with said load, said load dump circuit being connected in parallel when the voltage applied to the load continues to increase for more than a predetermined period.

* * * * *